Dec. 30, 1924.

H. M. SPECHT

VEHICLE WHEEL 1,521,258

Original Filed July 18, 1923

INVENTOR
H. Mortimer Specht.
BY
ATTORNEY

Patented Dec. 30, 1924.

1,521,258

UNITED STATES PATENT OFFICE.

HARRY MORTIMER SPECHT, OF PELHAM, NEW YORK.

VEHICLE WHEEL.

Original application filed July 18, 1923, Serial No. 652,207. Divided and this application filed December 13, 1923. Serial No. 680,323.

*To all whom it may concern:*

Be it known that I, HARRY MORTIMER SPECHT, a citizen of the United States, residing at Pelham, in the county of Westchester and State of New York, have invented a new and useful Improvement in Vehicle Wheels, of which the following is a specification.

This invention relates to vehicle wheels, and particularly to the disk type, and it is also in the nature of a modification in form of the construction shown in my copending patent application filed July 18th, 1923, Serial No. 652,207.

This particular form was originally shown, described and claimed in the said application Serial No. 652,207 and is now filed as a divisional application thereof. It has been found in use and actual practice that disk type wheels of this kind are especially adapted for use on motor driven vehicles of all kinds, as the resiliency, rigidity and strength needed to meet the stresses and strains of rough roads, heavy loads and high speed may be attained with a marked reduction in the weight of the wheel.

My construction can be made of a light weight metal and produced at a low cost to the end that it may be marketed at a reasonable price.

As shown in the drawings and described hereinafter the surface of the disk between the rim and hub of the wheel is formed with a series of substantially parallel corrugations radiating from the hub to the rim and a series of struck up portions in the said corrugations.

It is obvious that in the production of a disk surface of this kind the radial corrugations can be made of any desired width, depth or radial curve and that the struck up portions can be varied in size and located with relation to each other in the manner best calculated to meet the conditions under which the wheel will be used in traffic.

Wheels constructed in accordance herewith possess a greatly increased resilience or elasticity which enables them to take up or absorb between the rim and the hub the jars or vibrations created by the inequalities of the road being travelled, and thereby producing an additional smoothness and freedom from shock to that obtained from the use of cushion or pneumatic tires.

I have discovered that under some conditions, the hub of this type of wheel for a very brief period of time is slightly out of perfect alignment with the plane of the disk surface, or removed a very short distance from the exact centre of the disk, but that practically immediately it returns to its proper position in the said exact centre, and in perfect parallelism with the plane of the disk surface.

In the drawings herewith:—

Figure 1:
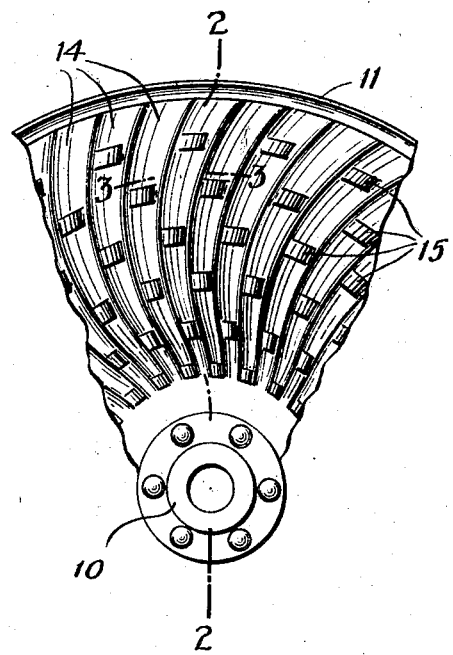
Fig. 1 is a fragmentary elevation.
Figure 2:
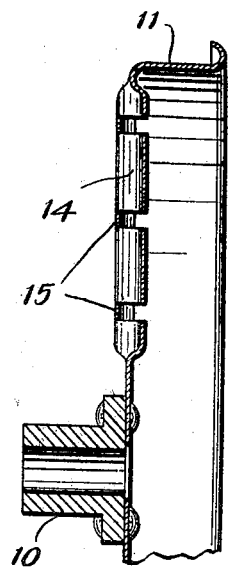
Fig. 2 is a sectional view on line 2—2 of Fig. 1.
Figure 3:
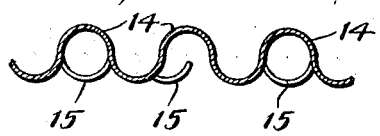
Fig. 3 is an enlarged sectional view on line 3—3 of Fig. 1.

In my co-pending application Serial No. 652,207 a type of wheel is shown with annular corrugations but herein the corrugations extend radially from the hub to the rim.

In the drawings the numeral 10 indicates a wheel hub and 11 is the rim, both being of the usual and suitable type, and 14 indicates the alternately concaved or convexed corrugations extending side by side from the hub to the rim with the oppositely curved openings cut out in the said corrugations.

In fabricating this construction pressed steel could be used but it would also be practicable to utilize other metals which could be cast or molded.

From the foregoing it will be seen that the alternately convexed and concaved surfaces constituting the disk of the wheel will act to absorb between the rim and the hub the jars, shocks and vibrations incidental to traffic many of which are not completely absorbed by the tires or the springs of the vehicle.

There are a number of forms of my invention not shown herein which fall within the scope and breadth thereof and I do not desire to limit myself strictly to the preferred form shown herewith.

I claim:—

1. In a vehicle wheel, a disk member adapted to be attached to the hub of the wheel and provided with a plurality of radial corrugations having struck up portions in their plane surfaces.

2. In a vehicle wheel, a disk member adapted to be attached to the hub of the wheel and provided with a plurality of radial corrugations alternately concaved and convexed with relation to the plane of the surface of the disk and having struck up portions in their plane surfaces.

3. In a vehicle wheel, a disk member adapted to be attached to the hub of the wheel and provided with a plurality of substantially parallel curved radial corrugations having struck up portions in their plane surfaces.

4. In a vehicle wheel, a disk member adapted to be attached to the hub of the wheel and provided with a plurality of radial corrugations having struck up portions in staggered relation to one another in their plane surfaces.

5. In a vehicle wheel, a disk member adapted to be attached to the hub of the wheel and provided with a plurality of radial corrugations having oppositely curved openings cut in their plane surfaces.

HARRY MORTIMER SPECHT.

Witnesses:—
WM. A. TIEDEMANN,
MAUDE ELSIE DOWNING.